J.S. Stewart's Building Block.

72557

PATENTED
DEC 24 1867

Witnesses: J. W. Ellis, Jas. White

Inventor: J. S. Stewart by J. K. Alexander, Atty.

UNITED STATES PATENT OFFICE.

J. S. STEWART, OF HOMER, NEW YORK.

IMPROVED BUILDING-BLOCK.

Specification forming part of Letters Patent No. 72,557, dated December 24, 1867.

*To all whom it may concern:*

Be it known that I, J. S. STEWART, of Homer, in the county of Cortland and State of New York, have invented certain new and useful Improvements in Bricks or Blocks for Building Purposes; and I do hereby declare that the following is a full, clear, and exact description thereof, reference being had to the accompanying drawings, and to the letters of reference marked thereon, which form a part of this specification, in which—

Figure 1:
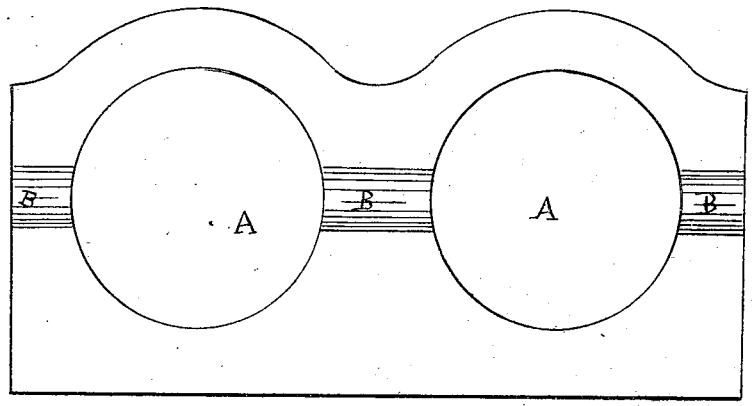
Figure 2:
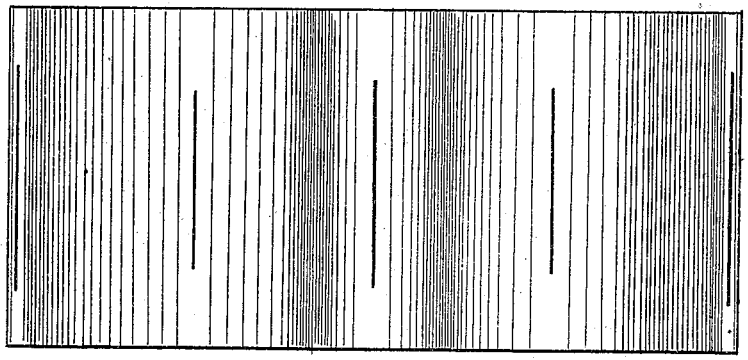

Figure 1 is a plan of the block, and Fig. 2 a a side elevation of the same.

The material for making my block is prepared as follows: A platform is first prepared, of suitable size. Throw upon it as much sand as desired, and then add from one-fourth to one-third as much of Rosendale cement. I then thoroughly mix the two ingredients with a hoe, at the same time adding as much cold water as to bring them to the proper consistency for molding. The material thus made is packed in an iron mold by means of an iron bar or other suitable tool or instrument. The shape of my block is designed to be plane on its back and ends, as seen in Fig. 1, while its front side is corrugated, as shown in the same figure. Through the block there are two vertical openings, A A, and longitudinally across the center of its upper surface is the concave depression or groove B, so that when the block is laid there will be both a vertical and horizontal circulation throughout the entire structure.

What I claim, and desire to secure by Letters Patent, is—

A building-block constructed with corrugated side and vertical and horizontal openings, substantially as and for the purpose described.

In testimony that I claim the foregoing as my own I affix my signature in presence of two witnesses.

J. S. STEWART.

Witnesses:
    ISAAC W. BROWN,
    ISAAC SMITH.